Dec. 2, 1969    R. J. MAYERJAK    3,481,158
FLEXIBLE COUPLING
Filed July 22, 1968    3 Sheets-Sheet 1

INVENTOR.
ROBERT J. MAYERJAK
BY
McCormick, Paulding & Huber
ATTORNEYS

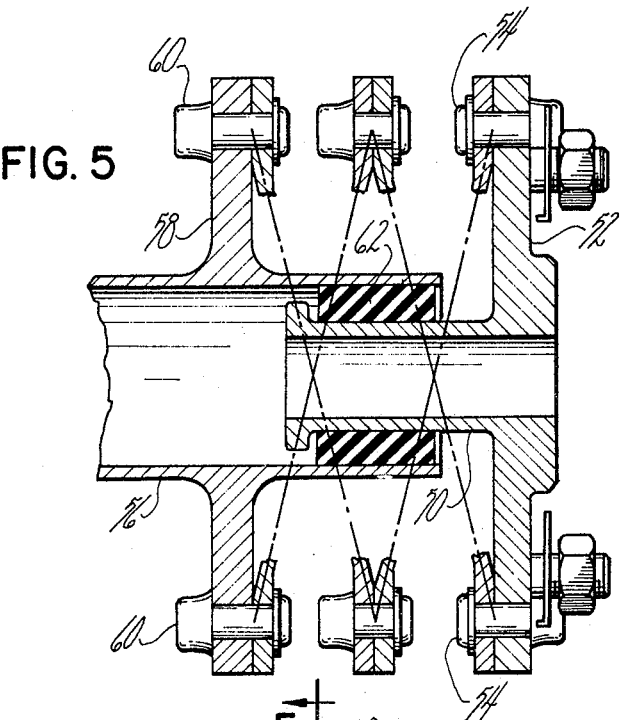
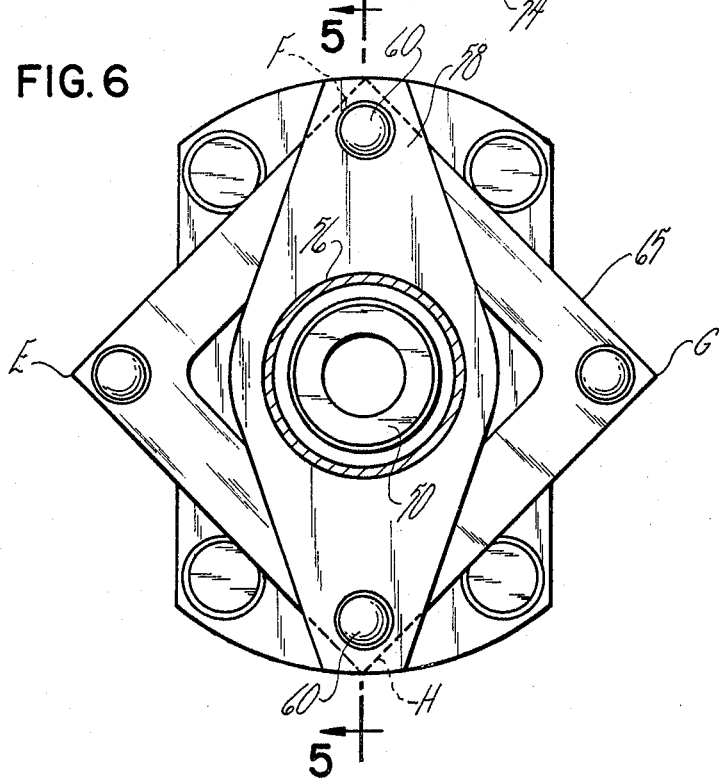

United States Patent Office 3,481,158
Patented Dec. 2, 1969

3,481,158
FLEXIBLE COUPLING
Robert J. Mayerjak, Torrington, Conn., assignor to
Kaman Corporation, Bloomfield, Conn., a corporation of Connecticut
Filed July 22, 1968, Ser. No. 746,526
Int. Cl. F16d 3/52, 3/62
U.S. Cl. 64—12                               14 Claims

ABSTRACT OF THE DISCLOSURE

A drive shaft and a shaft to be driven have fittings with diametrically opposed flange portions in which bolts are mounted to receive two of three rectangular flexing elements. These flexing elements may be square, with equal length leg portions defining diagonally opposed corners, or vertices, and are connected to one another along alternate diagonals formed by these vertices, or along mutually perpendicular radially extending planes containing these diagonals. The square flexing elements are non-planar, with alternate pairs of these vertices axially displaced from one another so that bolts connecting adjacent flexing elements cannot interfere with one another, especially during axial misalignment of the shafts. In the preferred embodiment, the flexing elements are rectangular with one set of opposed leg portions being slightly shorter than the other set. The non-square, rectangular, flexing elements are arranged in axially offset relationship with respect to one another, that is, with alternate diagonals or radially extending planes defined by their interconnected vertices angularly spaced with respect to the axis of rotation of the coupling to permit minimizing the non-planar aspect of these flexing elements while still providing sufficient clearance between adjacent bolts connecting the same during axial misalignment of the shafts.

SUMMARY OF INVENTION

This invention relates to flexible couplings, and deals more particularly with a coupling comprising flexible resilient elements capable of transmitting torque at a substantially constant rotational speed in spite of axial misalignment between the driving member and a driven member.

A general object of the present invention is to provide a flexible coupling of the foregoing character wherein the coupling has a minimum number of moving parts, and which coupling is therefore not only relatively inexpensive to manufacture, but is also relatively maintenance free during extended periods of use.

Another general object of the present invention is to provide a flexible coupling of the foregoing character wherein its component parts are so arranged that frictional contact therebetween is minimized or eliminated, the forces being reacted through internal stresses in novel square or rectangular flexing elements connected one to another in a unique manner to provide a flexible coupling capable of accommodating angular misalignment, or displacement, of the axes of rotation of a driving and a driven member.

The drawings show preferred embodiments of the invention and such embodiments have been described but it will be understood that various changes may be made from the construction disclosed and that the drawings and description are not to be construed as defining or limiting the scope of the invention, the claims forming a part of this specification being relied upon for that purpose.

BRIEF DESCRIPTION OF DRAWINGS

FIG. 5 is a vertical sectional view through the coupling of FIG. 4.

FIG. 6 is an end view of the coupling shown in FIG. 4.

DETAILED DESCRIPTION

Figure 1:
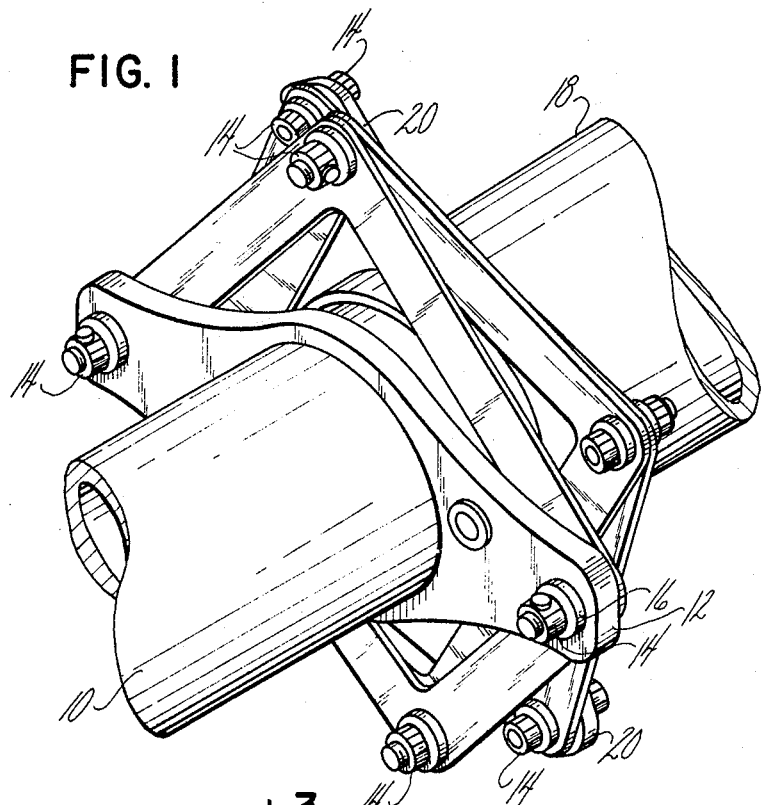
FIG. 1 is a perspective view of a flexible coupling constructed in accordance with the present invention, and showing the coupling connected to a driving shaft and to a driven shaft, which shafts may be out of alignment with one another.
Figure 2:
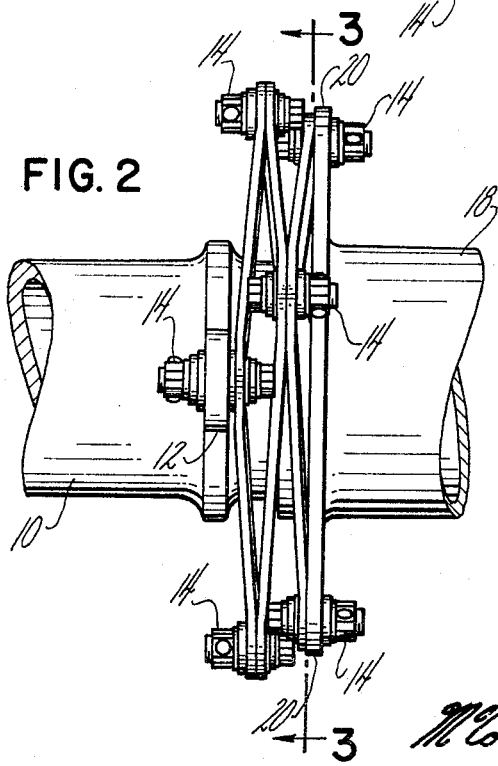
FIG. 2 is an elevational view of the coupling shown in FIG. 1.
Figure 3:
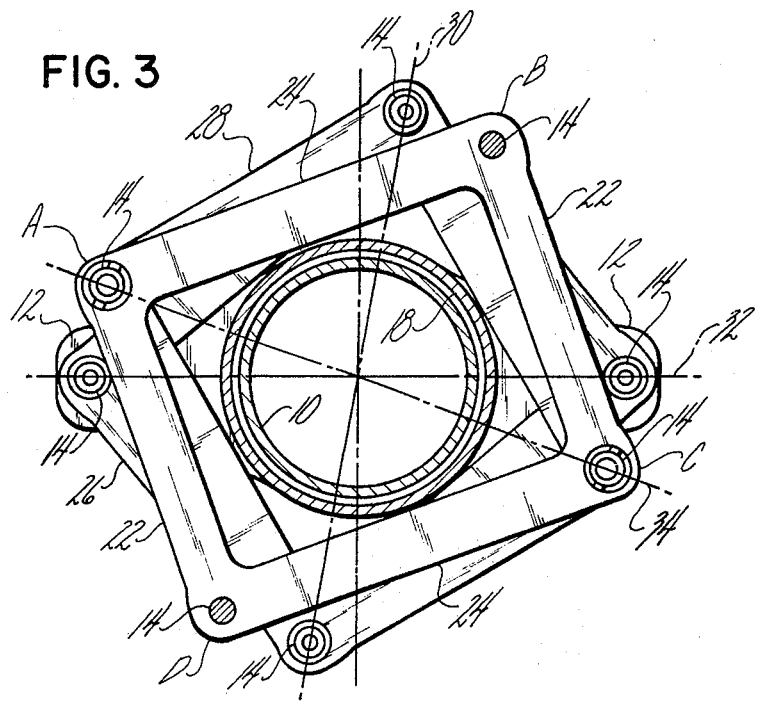
FIG. 3 is a sectional view taken along the line 3—3 of FIG. 2.

Referring first to the flexible coupling construction shown in FIGS. 1, 2, and 3, a drive member is shown at 10 as comprising a generally tubular drive shaft which may be driven by any suitable means for one end, and is fitted with a flanged fitting 12 adjacent its other end. The flanged fitting 12 has diametrically opposed ears which define openings for receiving suitable attachment means in the form of threaded fasteners such as the bolts indicated generally at 14, 14. These openings in the flanged portions of the fitting 12 may be provided with suitable bushings 16, 16 of conventional construction in order to reduce wear upon the flanges 12, 12. The driven member 18 shown in FIG. 1 also comprises a hollow shaft which is also provided with a fitting 20 having flanged portions extending radially outwardly in diametrically opposed relationship to one another with openings in which suitable bushings are provided for receiving the bolts 14, 14.

In accordance with the present invention, at least one quadrilateral flexing element is mounted between these fittings 12 and 20 for transmitting torque between the drive shaft 10 and the driven shaft 18 especially when the axes of rotation of the shafts are not in alignment with one another. In the preferred embodiment shown in FIGS. 1, 2, and 3, three rectangular flexing elements are provided and each has two sets of opposed leg portions as indicated generally at 22, 22 and 24, 24 in the last-mentioned figure. Each such leg portion in each set is integrally connected to the leg portions in the other set to define four vertices A, B, C, and D as shown in FIG. 3, with respect to the uppermost flexing element in that view. This particular flexing element is connected to the driven member and more particularly to the flanged portions of the fitting 18 at two diagonally opposed vertices B and D by the bolts 14, 14 shown in section in FIG. 3.

The lowermost rectangular flexing element 26 in FIG. 3 is similarly connected to the flanged portions of the fitting 12 associated with the drive member 10 by the bolts 14, 14. In accordance with the presently preferred embodiment shown in FIGS. 1, 2 and 3, a third rectangular flexing element 28 is provided between the element associated with the driven shaft and the element 26 associated with the drive shaft 10, and it is an important feature of the present invention that the flexing elements are connected to one another along only a single diagonal line, or radially extending plane, as for example the line 30 connecting the bolts 14, 14 which serve to interconnect the flexing elements 26 and 28. It is noted that the other diagonally opposed vertices of these elements 26 and 28 define additional radially extending planes 32 and 34, both of which planes are angularly spaced from one another so that the bolts 14, 14 associated with these planes can be used to connect either other rectangular flexing elements thereto, or to connect the coupling to a fitting such as that shown at 12. As a result of this construction, the bolts 14, 14 occupy a staggered relation around the periphery of the coupling as best shown in FIGS. 1 and 2 permitting the axial extent of the coupling to be effectively minimized. This important feature of the present invention is achieved as a result of the rectangular configuration of the flexing elements 26 and 28 wherein one of the sets of leg portions in each such element are slightly shorter in length than those comprising the second set in that particular element.

Each of the flexing elements is preferably non-planar so as to have one pair of diagonally opposed vertices, as for example A and C, axially spaced from the second pair of vertices, for example B and D, whereby the adjacent flexing elements are not only staggered angularly with respect to one another as a result of the above-mentioned rectangular flexing element configuration, but the vertices, or bolt attachment points, are also spaced axially as a result of the non-planar configuration of these elements.

Figure 4:
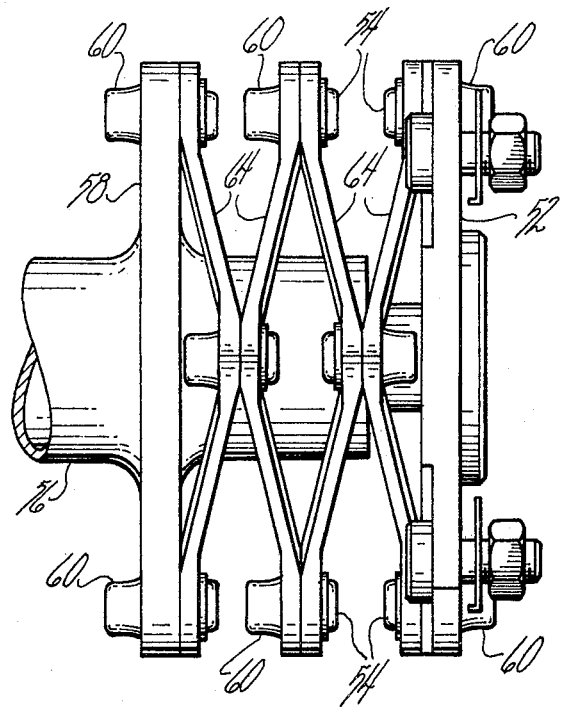
FIG. 4 is an elevational view of a flexible coupling of alternative construction incorporating the present invention.

Referring next to the flexible coupling construction shown in FIGS. 4, 5 and 6, a drive member (not shown) is drivingly connected to the flanged fitting 52 and may be driven by any suitable means from one of its ends. The drive member or shaft is fitted with a flanged fitting 52 at its other end in a manner similar to that described hereinabove with reference to the flanged fitting 12 in the previously described embodiment. The fitting 52 has diametrically opposed ears which define openings for receiving suitable attachment means in the form of threaded fasteners, such as the bolts indicated generally at 54, 54. A driven member 56 comprises a hollow shaft which is also provided with a fitting 58 having flanged portions extending radially outwardly in diametrically apposed relationship to one another. The fitting 58 has openings in which suitable bolts 60, 60 are adapted to be received.

In accordance with the present invention, one or more rectangular flexing elements is mounted between these fittings 52 and 58 for transmitting torque between the driven shaft and the driven shaft 56, especially when the axes of rotation of these shafts are not in alignment with one another. In the embodiment shown in FIGS. 4, 5 and 6 each of these rectangular flexing elements has two sets of opposed leg portions as indicated generally at 64, 64 in FIG. 4. Each such leg portion in each set is integrally connected to the leg portions in the other set to define four vertices E, F, G and H as is best shown in FIG. 6 with respect to the endmost flexing element 65 in that view. This particular flexing element 65 is connected to the driven member, or shaft 56, and more particularly to the flanged portions of the fitting 58, at two diagonally opposed vertices F and H by the bolts 60, 60 metnioned hereinabove.

A similar rectangular flexing element is similarly connected to the flanged portions of the fitting 52 associated with the drive member 50. In accordance with this particular embodiment of the present invention, intermediate rectangular flexing elements are provided between the elements associated with the driven shaft and the drive shaft respectively, and it is an important feature of the present invention that these flexing elements are connected to one another along a single diagonal line or radially extending plane as for example the line connecting the bolts 54, 54 or the line connecting the bolts 60, 60.

In order to provide clearance between the attachment bolts 54, 60 and the bolts used to connect the intermediate flexing elements is preferably non-planar so as to have one pair of diagonally opposed vertices, as for example E and G, which are axially spaced from the second pair of vertices for example F and H whereby the adjacent flexing elements are spaced axially as a result of their non-planar configuration. Thus, in this particular embodiment the leg portions are of equal length resulting in flexing elements of square planform providing a flexible coupling of symmetrical appearance. Since it will be apparent that this particuar embodiment of flexible coupling incorporating the present invention occupies a greater axial dimension than that described hereinabove with reference to FIGS. 1, 2 and 3, it should be noted that it has particular use in an aparatus where the drive shaft can be accommodated inside the driven shaft 56. Where the space limitations in the hollow driven shaft 56 permit this arrangement, the flanged fitting 58 can be provided at some distance from the end of the driven shaft, with the result that no severe penalty need be paid for the greater axial dimension of this coupling as compared with that described hereinabove with reference to FIGS. 1, 2 and 3.

Some advantages of a flexible coupling constructed in accordance with the present invention are, first the use of a plurality of similarly shaped flexing elements contributes to the low cost of the original unit as well as to reducing the inventory of replacement parts required by a user of these units. Secondly the structural redundancy of the construction is achieved by the use of a plurality of legs in each flexing element. Failure of one element does not cause a complete failure of the entire system, the remaining leg portions serving to absorb the load of the one which has failed. A third advantage to the design described is that by judicious selection of the size of the fastener elements, or bolts used to connect the various fastener elements, one can limit the torque carried by the device through a planned rupture of the fastener elements instead of designing the device for failure of the flexing elements. Finally, in the embodiment described hereinabove with reference to FIGS. 4, 5 and 6, the use of an elastomeric bushing 62 between the drive and the driven shafts has the result of increasing the fundamental natural frequency of the overall coupling, and providing damping in order to further reduce undesirable vibrations. The bushing 62 is mounted on an extension 50 of the drive fitting 52, and this extendsion 50 can engage the inner wall of the driven shaft 56 to provide a fail safe restraint in the event of failure of one or more of the flexing elements.

I claim:

1. A flexible coupling for transmitting rotary motion from a drive member to a driven member, said coupling comprising a plurality of rectangular flexing elements, each of said flexing elements having two sets of opposed leg portions, each such leg portion in each set being integrally connected to the leg portions in the other set to define four vertices in said flexing element, attachment means for connecting two diagonally opposed vertices in one of said elements to the drive member, attachment means for connecting two diagonally opposed vertices in another of said elements to the driven member, attachment means for connecting the other two diagonally opposed vertices of said one element to two diagonally opposed vertices of at least one additional flexing element, and means for connecting said other diagonally opposed vertices of said additional flexing element to the other diagonally opposed vertices of said element which is connected to said driven member.

2. A flexible coupling as set forth in claim 1 wherein said attachment means include fittings for said drive and said driven members, each of said fittings having flanged portions which are spaced radially from the respective axes of rotation of said members to receive said vertices of said respective rectangular flexing elements.

3. A flexible coupling as set forth in claim 2 wherein said attachment means further include a plurality of fastener elements all of which extend through openings provided therefor in the vertices of said flexing elements and through openings in said fittings and wherein said means for connecting said other diagonally opposed vertices of said additional flexing element to the other diagonally opposed vertices of said element which is so connected to the fitting associated with said driven member also comprise fastener elements extending through openings provided therefor in the vertices of said flexing elements.

4. A flexible coupling as set forth in claim 1 wherein said leg portions comprising one of said sets in each rectangular flexing element are slightly shorter than those comprising said second set of that element, and wherein the interconnected flexing elements are so arranged that adjacent elements have only their interconnected vertices in a common radially extending diagonal plane the other diagonally opposed vertices of each of said adjacent flexing elements defining additional radially extending planes which are angularly spaced from one another with respect to the axis of rotation of said coupling.

5. A flexible coupling as set forth in claim 4 wherein said attachment means include fittings for said drive and said driven members, each of said fittings having flanged portions which are spaced radially from the respective axes of rotation of said members to receive said vertices of said respective flexing elements.

6. A flexible coupling as set forth in claim 5 wherein said attachment means further include a plurality of fastener elements all of which extend through openings provided therefor in the vertices of said flexing elements and through openings in said fittings, and wherein said means for connecting said other diagonally opposed vertices of said additional flexing element to the other diagonally opposed vertices of said element which is so connected to the fitting associated with said driven member also comprise fastener elements extending through openings provided therefor in the vertices of said elements.

7. A flexible coupling as set forth in claim 6 wherein said flexing elements are non-planar and have one pair of diagonally opposed vertices axially spaced from the second pair whereby adjacent flexing elements are spaced angularly as a result of said angular spacing between said other diagonally opposed vertices and are also spaced axially as a result of their non-planar configuration.

8. A flexible coupling as set forth in claim 1 wherein said leg portions comprising said first and second sets in said flexing elements are of equal length whereby said flexing elements are of square planform, said flexing elements being non-planar with one pair of diagonally opposed vertices axially spaced from the second pair.

9. A flexible coupling as set forth in claim 8 wherein said attachment means include fittings for said drive and said driven members, each of said fittings having flanged portions which are spaced radially from the respective axes of rotation of said members to receive said vertices of said respective flexing elements.

10. A flexible coupling as set forth in claim 9 wherein said attachment means further include a plurality of fastener elements all of which extend through openings provided therefor in the vertices of said flexing elements and through openings in said fittings, and wherein said means for connecting said other diagonally opposed vertices of said additional flexing element to the other diagonally opposed vertices of said element which is so connected to the fitting associated with said driven member also comprise fastener elements extending through openings provided therefor in the vertices of said flexing elements.

11. A flexible coupling for transmitting rotary motion from a drive member to a driven member, said coupling comprising at least one quadrilateral flexing element, said element having two sets of opposed leg portions, each such leg portion in each set being integrally connected to the leg portions in the other set to define four vertices in said flexing element, attachment means for connecting two diagonally opposed vertices in one of said elements to the drive member, means for connecting the other two diagonally opposed vertices of said element to the driven member, said means for attaching and connecting said diagonally opposed pairs of vertices to said drive and said driven member respectively including fittings with flanged portions which are spaced radially from the respective axes of rotation of said members to receive said vertices.

12. A flexible coupling as set forth in claim 11 wherein a plurality of flexing elements are attached to one another at their diagonally opposed vertices, all of said elements being non-planar so that one pair of opposed vertices is axially spaced from the second pair in each element.

13. A flexible coupling as set forth in claim 12 wherein said drive and said driven members are of different size so that an extension of one fits loosely in the other to provide a fail-safe construction in the event of structural failure of one of said flexing elements.

14. A flexible coupling as set forth in claim 13 and further characterized by an elastomeric bushing mounted between said extension and said member to increase the natural frequency of the overall coupling and provide damping to reduce vibration.

References Cited

UNITED STATES PATENTS

| | | | |
|---|---|---|---|
| 1,455,242 | 5/1923 | Corgiat et al. | 64—13 |
| 1,682,720 | 8/1928 | Bijur | 64—13 |
| 3,004,409 | 10/1961 | Grey | 64—12 |
| 3,250,089 | 5/1966 | Bruyere | 64—11 |

HALL C. COE, Primary Examiner

U.S. Cl. X.R.

64—15